(12) United States Patent
Tiufektchian

(10) Patent No.: US 6,632,152 B1
(45) Date of Patent: Oct. 14, 2003

(54) ECCENTRIC PLANETARY GEARING

(76) Inventor: Assadour Missak Tiufektchian, Central Poste, PO Box 168, Rousse - 7000 (BG)

( * ) Notice: Subject to any disclaimer, the term of this patent is extended or adjusted under 35 U.S.C. 154(b) by 0 days.

(21) Appl. No.: 10/089,132

(22) PCT Filed: Sep. 27, 2000

(86) PCT No.: PCT/BG00/00025

§ 371 (c)(1),
(2), (4) Date: Mar. 25, 2002

(87) PCT Pub. No.: WO01/23775

PCT Pub. Date: Apr. 5, 2001

(30) Foreign Application Priority Data

Sep. 29, 1999 (BG) .............................................. 103769

(51) Int. Cl.[7] .............................................. F16H 1/32
(52) U.S. Cl. ...................................... 475/176; 475/181
(58) Field of Search ................................ 475/176, 181, 475/163, 164, 338

(56) References Cited

U.S. PATENT DOCUMENTS

| 2,481,627 A | | 9/1949 | Sharpe ........................ 74/804 |
| 3,074,294 A | * | 1/1963 | Woolley ................. 475/176 X |
| 3,453,907 A | * | 7/1969 | Noguchi et al. ............. 475/176 |
| 4,014,224 A | | 3/1977 | Pitts .............................. 74/805 |
| 4,016,780 A | * | 4/1977 | Baranyi ....................... 475/176 |
| 4,762,025 A | * | 8/1988 | Lew ........................ 475/176 X |
| 4,825,726 A | | 5/1989 | Schofield ..................... 74/801 |

FOREIGN PATENT DOCUMENTS

| JP | 401079447 | * | 3/1989 | ................. 475/176 |
| JP | 402072240 | * | 3/1990 | ................. 475/176 |
| JP | 06-109084 | | 4/1994 | ............. F16H/1/32 |
| RU | 206 8131 | | 10/1996 | ............. F16H/1/32 |

OTHER PUBLICATIONS

Kudriavtzev, V. N. et al., Planetary Transmissions Handbook (in Russian). Selected portions (pp. 1, 2, 13–15, and 36–43) are included herewith.

* cited by examiner

Primary Examiner—Charles A Marmor
Assistant Examiner—Ha Ho
(74) Attorney, Agent, or Firm—Thomas A. Gallagher

(57) ABSTRACT

An eccentric planetary gearing comprises two internally toothed gears, a double-ring externally toothed planetary gear and a planet carrier. The planet carrier is composed of support means for providing the rotatable mounting of the planet carrier itself and the rotatable mounting of the double-ring externally toothed planetary gear, said support means being integrated into a rigid member through two interjacent crescent-shaped sections consecutively disposed relative to one another. Each of the interjacent crescent-shaped sections is disposed within the space between the respective gear ring of the double-ring externally toothed planetary gear and the respective internally toothed gear.

2 Claims, 9 Drawing Sheets

ECCENTRIC PLANETARY GEARING

CROSS-REFERENCE TO RELATED APPLICATIONS

This application claims priority from PCT application Ser. No. PCT/BG00/00025 filed on Sep. 27, 2000, which in turn claims priority from Bulgarian patent application Ser. No. 103769 filed on Sep. 29, 1999.

BACKGROUND OF THE INVENTION

This invention relates to an eccentric planetary gearing and can find commercial application first and foremost if implemented as a gear-type speed reducer in the driving systems of industrial machines and equipment.

In the present description, in correspondence with the International Patent Classification, Seventh Edition, Subclass F16H 1/32, by eccentric planetary gearing is meant a planetary gearing in which, as distinct from other planetary gearings, the central axis of the gearing lies inside the periphery of at least one planetary gear.

An eccentric planetary gearing, comprising two internally toothed gears, a double-ring externally toothed planetary gear and a planet carrier, is known in the prior art. The double-ring externally toothed planetary gear has the design of a cluster gear comprising two externally toothed gear rings of different diameters coaxially aligned and consecutively disposed relative to one another. The internally toothed gears are coaxially aligned and consecutively disposed relative to one another and their common axis is central axis of the gearing. One of the internally toothed gears is mounted for a rotation, and the other is held in a fixed position and does not rotate. The planet carrier is mounted for rotation about the central axis of the gearing. The double-ring externally toothed planetary gear is rotatably mounted on the planet carrier. The axis of the double-ring externally toothed planetary gear is parallel to and offset from the central axis of the gearing, and the respective eccentricity is less than the outside radius of the double-ring externally toothed planetary gear so that the central axis of the gearing lies inside the periphery of the double-ring externally toothed planetary gear. Each of the internally toothed gears is in meshing engagement with a respective gear ring of the double-ring externally toothed planetary gear.

Usually, the planet carrier is constructed as an eccentric shaft, the latter being integral with a high-speed shaft of the gearing. The rotatable internally toothed gear is secured to a slow-speed shaft of the gearing. The high-speed and the slow-speed shafts of the gearing are coaxially aligned and their common axis is coincident with the central axis of the gearing. An eccentric planetary gearing of such design, comprising two counterweights secured to the eccentric shaft, is described, for example, in U.S. Pat. No. 4,014,224. The counterweights are disposed on both sides of the double-ring externally toothed planetary gear. The eccentric shaft, the double-ring externally toothed planetary gear and the counterweights constitute a system which is statically and dynamically balanced in respect to the central axis of the gearing.

In addition to the above-described eccentric planetary gearing, some modifications of its should be considered herein as background of the invention. For example, the planet carrier can be constructed as a built-up crankshaft of composite and collapsible design. A planet carrier of a similar design is described, for example, in U.S. Pat. No. 2,481,627. It is supposed in the present description that such a modification of the above-described eccentric planetary gearing can be classified as a combination of known gear designs, such combination being obvious to those skilled in the art.

Yet another modification of the above-described eccentric planetary gearing should be considered herein as background of the invention. This modification is characterized in that the corresponding planet carrier is composed of support means for providing the rotatable mounting of the planet carrier itself and the rotatable mounting of the double-ring externally toothed planetary gear, said support means being integrated into a rigid member through an interjacent crescent-shaped section disposed within the space between the double-ring externally toothed planetary gear and the internally toothed gears. A planet carrier of a similar design is described, for example, in U.S. Pat. No. 4,825,726. It is supposed in the present description that such a modification of the above-described eccentric planetary gearing can be classified as a combination of known gear designs, such combination being obvious to those skilled in the art.

Depending on the specific design of the planet carrier, the above-described eccentric planetary gearing and its modifications can have various advantages and disadvantages.

When the planet carrier is constructed as an eccentric shaft, the eccentric planetary gearing is characterized by relatively high torque-transmitting capacity, but at the same time it has low mechanical efficiency in operation and the frictional losses are much higher than for ordinary gearings. In Kudriavtzev V. N. et al., *Planetary transmissions, Handbook*, Mashinostroenie Publishing House, Leningrad, 1977, in Russian, at page 36–43, it is stated that if the eccentric planetary gearing operates as a gear-type speed reducer, the following functional relation should be valid:

$$E = \frac{1}{1 + |R - 1|L_P} \qquad (1)$$

wherein E is the mechanical efficiency, R is the gear ratio, and $L_P$ is a provisional dimensionless parameter, equal to the coefficient of frictional losses with which the gearing would operate should the planet carrier be fixed in a stationary position and the housing accordingly released. Supposing such an imaginary experiment is conducted, the eccentric planetary gearing would then be transformed into an ordinary gearing with fixed axes of rotation of all gears and with a total gear ratio close to 1.00, and then the respective coefficient of frictional losses would accordingly be of the order of less than one percent. For the purpose of clarification of formula (1) it should be specified that if, for example, R=101 and $L_P$=0.0025, then E=0.80. The coefficient of frictional losses of a gearing is the sum total of the coefficients of frictional losses in the meshing and in the bearings, as well as of the coefficient of frictional losses caused by the hydraulic resistance of the lubricating liquid. The methods for estimating the coefficient of frictional losses in the meshing, known from the existing references and discussed, for example, at page 36–43 of the above-referenced handbook, are confined to the implementation of simple calculation schemes and are represented by functional relations of a limited number. These methods for estimating the coefficient of frictional losses in the meshing are inappropriate when referring to the eccentric planetary gearings because the meshing in the real gearing, in this case, differs substantially from the theoretic one. This is due to the fact that the difference between the number of teeth of the gears in meshing engagement of internal gearset is usually too small in this case, and this peculiarity, in combination with the inevitable errors in the gearing and with the elastic deformation of the teeth in mesh, is the reason why the number of tooth pairs simultaneously in mesh is considerably greater than the theoretic one. That is why, in this case, estimating the coefficient of frictional losses in the meshing requires the elaboration of complex computer models and the implementation of appropriate calculation methods, such as Simulation and Finite Element Analyses. The experience suggests that, as a rule, the decrease in the absolute value of the gear ratio of an eccentric planetary gearing result in an increase in the corresponding mechanical efficiency. At the same time, when designing eccentric planetary gearing in which the planet carrier is constructed as an eccentric shaft, there are certain limitations in the case of decreasing the absolute value of the gear ratio. In this case, as stated at page 13–15 of the above-referenced handbook, the approximate bottom limit of the acceptable absolute values of the gear ratio is comparatively high, namely $|R|_{min} \approx 25$, and, respectively, the corresponding approximate top limit of the mechanical efficiency is comparatively low, namely $E_{max} \approx 0.90$. The reasons causing the above limitations when adhering to the design rationality criteria are directly related to the object of the invention and will be considered hereinafter.

In the present description, the fixed internally toothed gear is designated as F, the respective gear ring of the double-ring externally toothed planetary gear in meshing engagement with the latter is designated as A, the other gear ring of the double-ring externally toothed planetary gear is designated as B, and the rotatable internally toothed gear is designated as C. As it is known, the gear ratio R of the eccentric planetary gearing can be represented by the following equations:

$$R = \frac{1}{1 - \frac{N_F}{N_A}\frac{N_B}{N_C}} \quad (2)$$

$$R = \frac{1}{1 - \frac{D_F}{D_A}\frac{D_B}{D_C}} \quad (3)$$

$$R = \frac{1}{1 - \frac{D_F}{D_F - 2e}\frac{D_C - 2e}{D_C}} \quad (4)$$

$$R = \frac{1}{1 - \frac{1}{1 - 2[e/D_F]}\left[1 - \frac{2[e/D_F]}{[D_C/D_F]}\right]} \quad (5)$$

wherein N is the number of teeth of the respective gears and gear rings and D is their pitch-circle diameter, and e is the eccentricity of the gearing. It is apparent from formula (5) that the gear ratio R can be represented as a function of two independent dimensionless geometrical parameters, namely the ratios $e/D_F$ and $D_C/D_F$, which, for the purpose of clarity, have not been designated herein as special symbols. FIG. 1 and FIG. 2 represent the results of the optimization calculations of a plurality of eccentric planetary gearings with gear ratios within the range from $R_{min}=9.25$ to $R_{max}=11.25$. In FIG. 1 and FIG. 2, T is the maximum torque-transmitting capacity of the gearing, and, in particular, when referring to the torque transmitted through the rotatable internally toothed gear and, accordingly, through the slow-speed shaft of the gearing. There are certain parameters of a constant value, namely the pitch-circle diameter of the fixed internally toothed gear $D_F$, the load-carrying characteristics of the materials and the parameters characterizing the operating duty of the gearing. The calculations are of a provisional character as there is a number of inevitable limitations following from the choice of a specific design of the planet carrier which have not been taken into consideration. There is an important regular dependence known in the practice of gear design, which can be seen in FIG. 1 and FIG. 2, and, in particular, when analyzing the points of extremums on the corresponding curves. It can be seen that, if the design process aims at achieving a maximum torque-transmitting capacity of an eccentric planetary gearing, decreasing the absolute value of the gear ratio will require both an increase in the relative eccentricity of the gearing and an increase in the relative difference between the pitch-circle diameters of the internally toothed gears. At the same time, there are some practically insuperable difficulties in designing the eccentric planetary gearing with a comparatively large relative eccentricity when the planet carrier is constructed as an eccentric shaft. These difficulties result from the inevitable limitations following from the prerequisites for the assembly of the bearings mounted on the eccentric shaft and from the prerequisites for static and dynamic balancing of the gearing. That is why, in this case, the approximate bottom limit of the acceptable absolute values of the gear ratio is comparatively high which, in turn, predetermines the respective limitation of the maximum mechanical efficiency of the gearing.

Some of the limitations considered above and following from the prerequisites for the assembly of the bearings would be avoided if the first of the above-described modifications is implemented, and namely the one wherein the planet carrier is constructed as a built-up crankshaft of composite and collapsible design. At the same time, a planet carrier of such design would be characterized by an inherently insufficient load-carrying capacity, which would predetermine, in itself, a comparatively low torque-transmitting capacity of the gearing as a whole.

There are certain prerequisites for the implementation of the second of the above described modifications, and namely of the one wherein the planet carrier is composed of support means integrated into a rigid member through an interjacent crescent-shaped section. These prerequisites include the simultaneous fulfillment of two conditions—namely, the relative eccentricity of the gearing must be comparatively large and the relative difference between the pitch-circle diameters of the internally toothed gears must be comparatively small. It can be seen from FIG. 1 and FIG. 2 and from simple geometrical constructions that the simultaneous fulfillment of these conditions for the range of gear ratios considered above is in contradiction with adherence to the design rationality criteria from the standpoint of providing a maximum torque-transmitting capacity of the gearing.

The above-described eccentric planetary gearing and its modifications have not found significant commercial application mainly due to the above-considered disadvantages.

In addition to the above-described eccentric planetary gearing and its modifications and according to an aspect of secondary importance, a two-stage gear transmission, wherein the slow-speed stage has a design of an eccentric planetary gearing and the high-speed stage has a design of a conventional planetary gearing, should be considered herein as background of the invention too. The slow-speed and the high-speed stages of the transmission are coaxially aligned and have a common planet carrier. A two-stage gear transmission of such design is described, for example, in JP 06109084 A.

BRIEF SUMMARY OF THE INVENTION

It is an object of the present invention to provide an eccentric planetary gearing of relatively high torque-transmitting capacity and of high mechanical efficiency in operation.

According to the invention, there is provided an eccentric planetary gearing comprising two internally toothed gears, a double-ring externally toothed planetary gear and a planet carrier. The double-ring externally toothed planetary gear has the design of a cluster gear comprising two externally toothed gear rings of different diameters coaxially aligned and consecutively disposed relative to one another. The internally toothed gears are coaxially aligned and consecutively disposed relative to one another and their common axis is central axis of the gearing. One of the internally toothed gears is mounted for rotation, and the other is held in a fixed position and does not rotate. The planet carrier is mounted for rotation about the central axis of the gearing. The double-ring externally toothed planetary gear is rotatably mounted on the planet carrier. The axis of the double-ring externally toothed planetary gear is parallel to and offset from the central axis of the gearing, and the respective eccentricity is less than the outside radius of the double-ring externally toothed planetary gear so that the central axis of the gearing lies inside the periphery of the double-ring externally toothed planetary gear. Each of the internally toothed gears is in meshing engagement with a respective gear ring of the double-ring externally toothed planetary gear. The planet carrier comprises support means for providing the rotatable mounting of the planet carrier itself and the rotatable mounting of the double-ring externally toothed planetary gear, said support means being integrated into a rigid member through two interjacent crescent-shaped sections which are consecutively disposed relative to one another. Each of the interjacent crescent-shaped sections is disposed within the space between the respective gear ring of the double-ring externally toothed planetary gear and the respective internally toothed gear. The orthogonal projections of the interjacent crescent-shaped sections on a plane perpendicular to the central axis of the gearing are of different disposition relative to one another and, accordingly, at least one of the outer and the inner surfaces of the planet carrier is step-shaped along the junction of the interjacent crescent-shaped sections.

The eccentric planetary gearing of the present invention can have a relatively high torque-transmitting capacity and, along with that, high mechanical efficiency in operation. This is due to the acquired ability for simultaneous achievement of a large relative difference between the pitch-circle diameters of the internally toothed gears and of a large relative eccentricity, thus adhering to the design rationality criteria when the absolute value of the gear ratio is comparatively low.

The eccentric planetary gearing of the present invention can find commercial application as a separate single-stage gear unit as well as a constituent part of a two-stage or of a multi-stage gear transmission.

According to another aspect of the present invention, there is provided a two-stage gear transmission, wherein the slow-speed stage has the design of the eccentric planetary gearing of the present invention and the high-speed stage has a design of a planetary gearing too. The slow-speed and the high-speed stages are coaxially aligned and their common central axis is central axis of the transmission too. The slow-speed and the high-speed stages have a common planet carrier. The high-speed stage comprises an externally toothed sun gear mounted for rotation about the central axis of the transmission, an internally toothed gear mounted in concentric relation with the rotatable externally toothed sun gear and held in a fixed position, and at least two externally toothed planetary gears equidistantly spaced from the central axis of the transmission and rotatably mounted on the common planet carrier. Each of the externally toothed planetary gears of the high-speed stage is in meshing engagement both with the respective rotatable externally toothed sun gear and with the respective fixed internally toothed gear. The externally toothed planetary gears of the high-speed stage are displaced relative to each contiguous one by equal angles about the central axis of the transmission. Not all of the externally toothed planetary gears of the high-speed stage are of equal mass. The mass center of the set of externally toothed planetary gears of the high-speed stage is offset from the central axis of the transmission and the respective eccentricity is opposite in direction in comparison with the eccentricity of the axis of the double-ring externally toothed planetary gear of the slow-speed stage with respect to the central axis of the transmission.

In the two-stage gear transmission of the present invention the high-speed stage provides an effect of counterbalancing of the slow-speed stage, and vice versa. Thus the high-speed and the slow-speed stages of the transmission constitute an indivisible unitary system.

BRIEF DESCRIPTION OF THE SEVERAL VIEWS OF THE DRAWINGS

The invention is illustrated by way of example with reference to the accompanying drawings wherein.

DETAILED DESCRIPTION OF THE INVENTION

Figure 1:
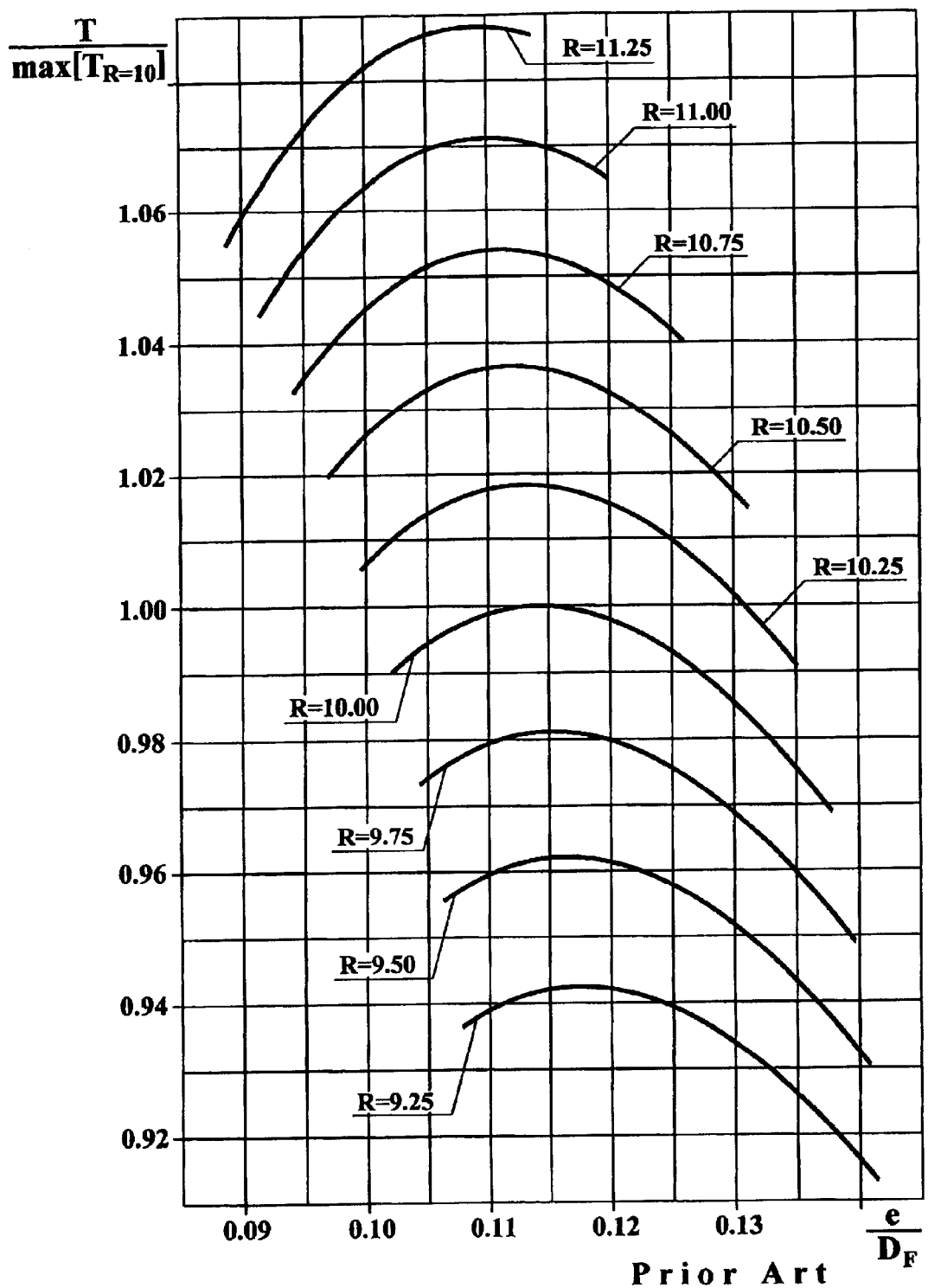
FIG. 1 and FIG. 2 represent a regular dependence which is known in the practice of gear design and has been discussed above.
Figure 2:
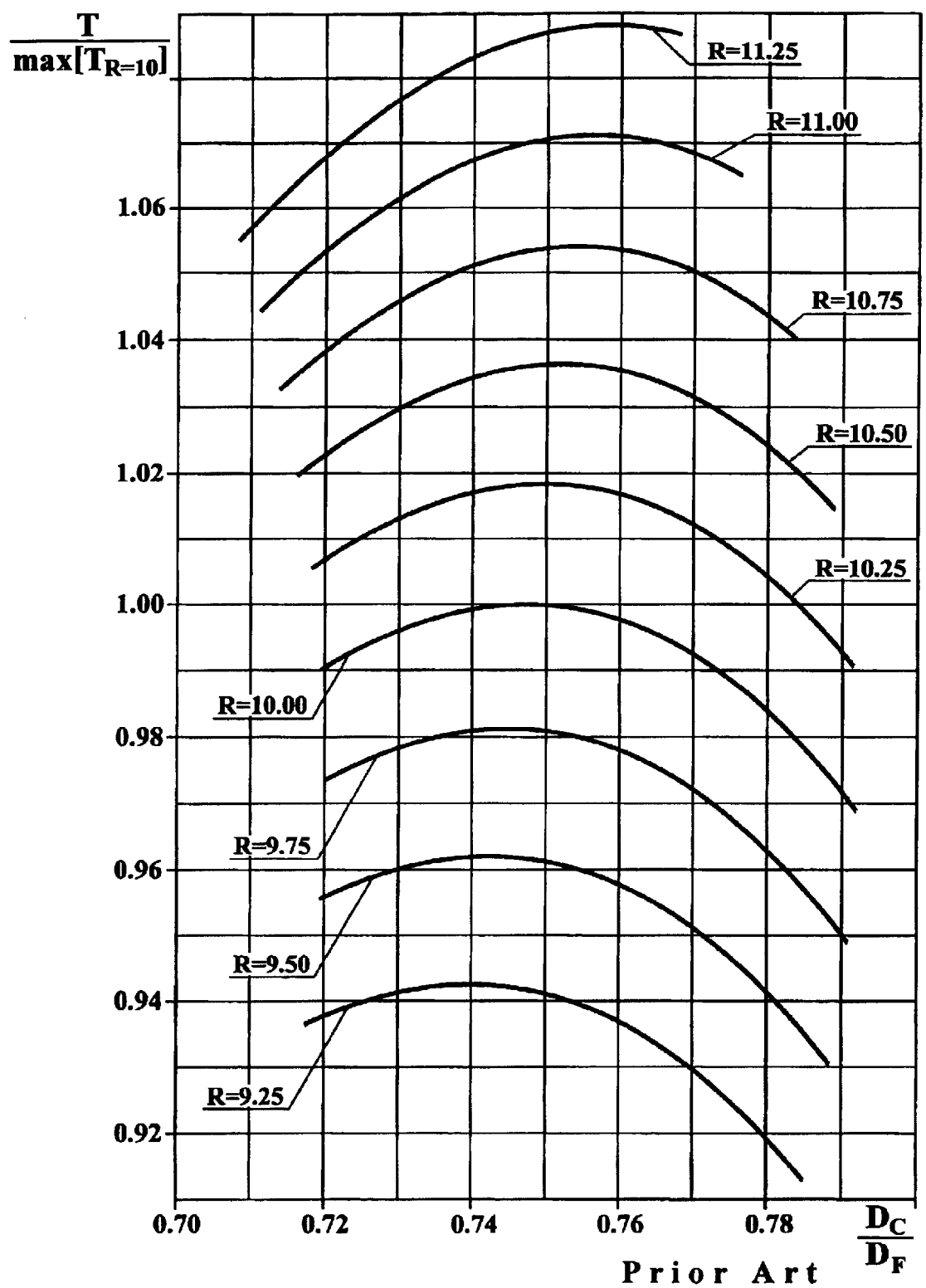
Figure 3:
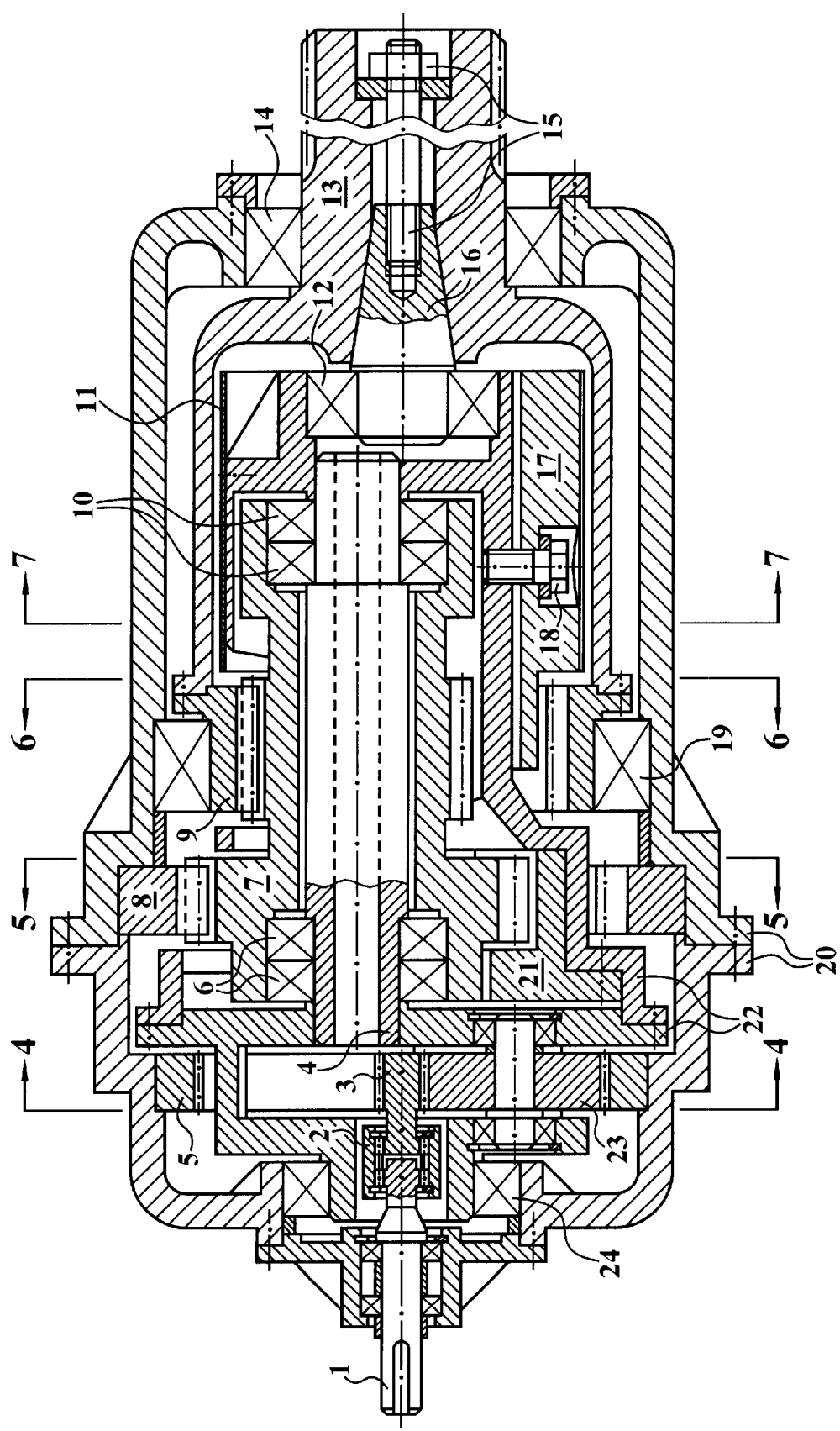
FIG. 3 is a longitudinal sectional view of a two-stage gear transmission designed in accordance with the present invention.
Figure 4:
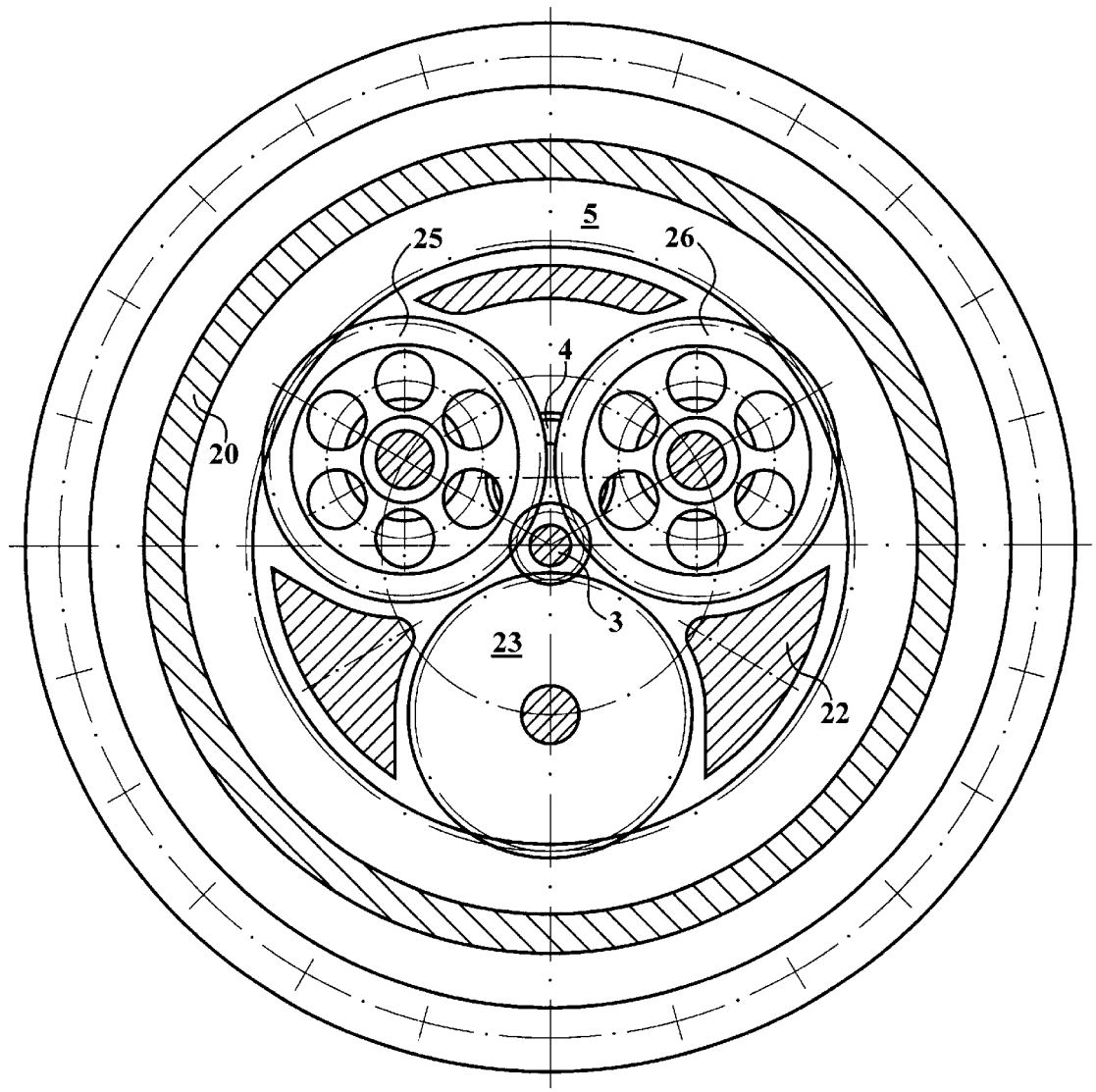
FIG. 4, FIG. 5, FIG. 6 and FIG. 7 are transverse sectional views taken along the lines 4—4, 5—5, 6—6 and 7—7 of FIG. 3 respectively and looking in the direction of the corresponding arrows.
Figure 5:
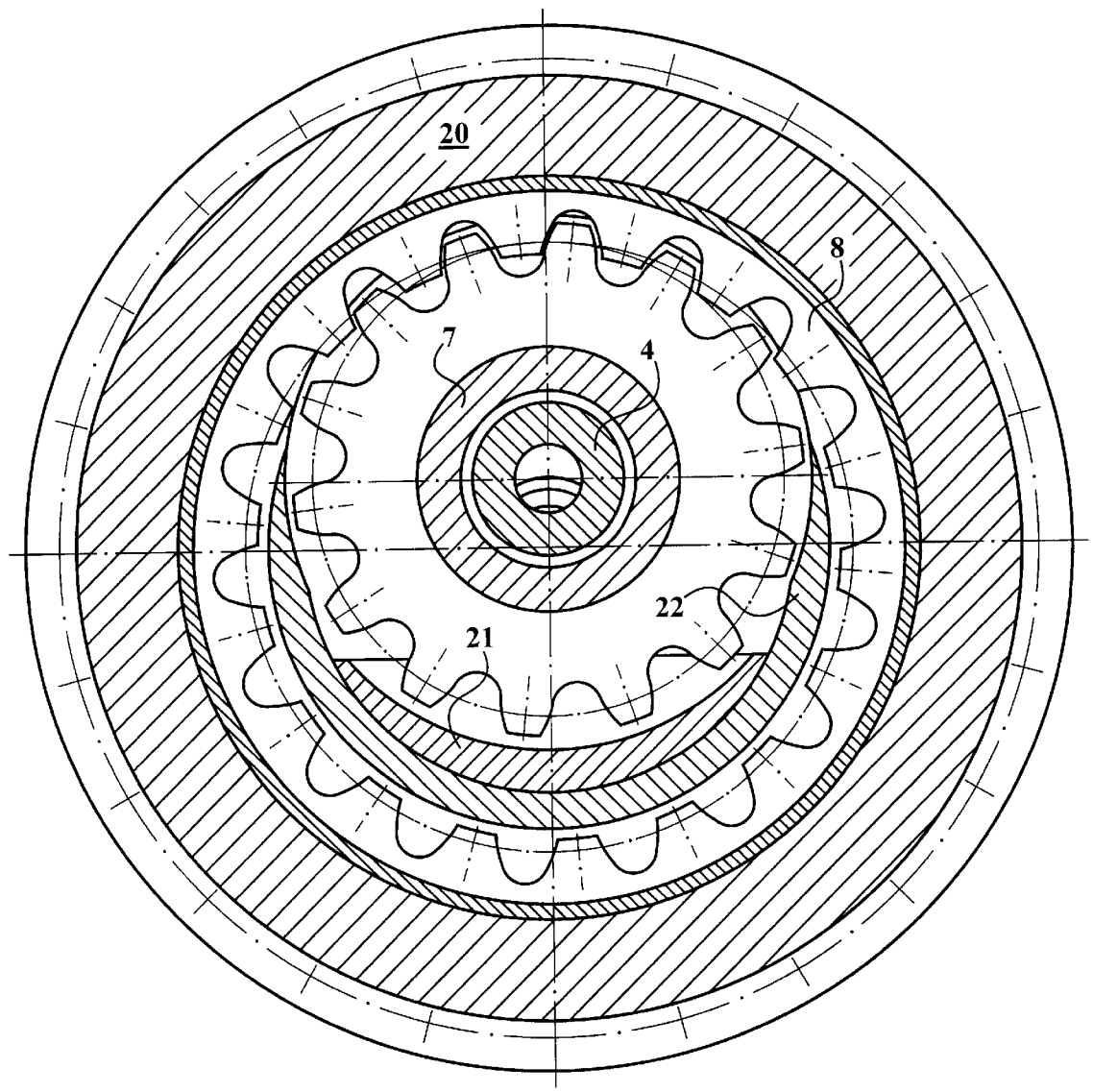
Figure 6:
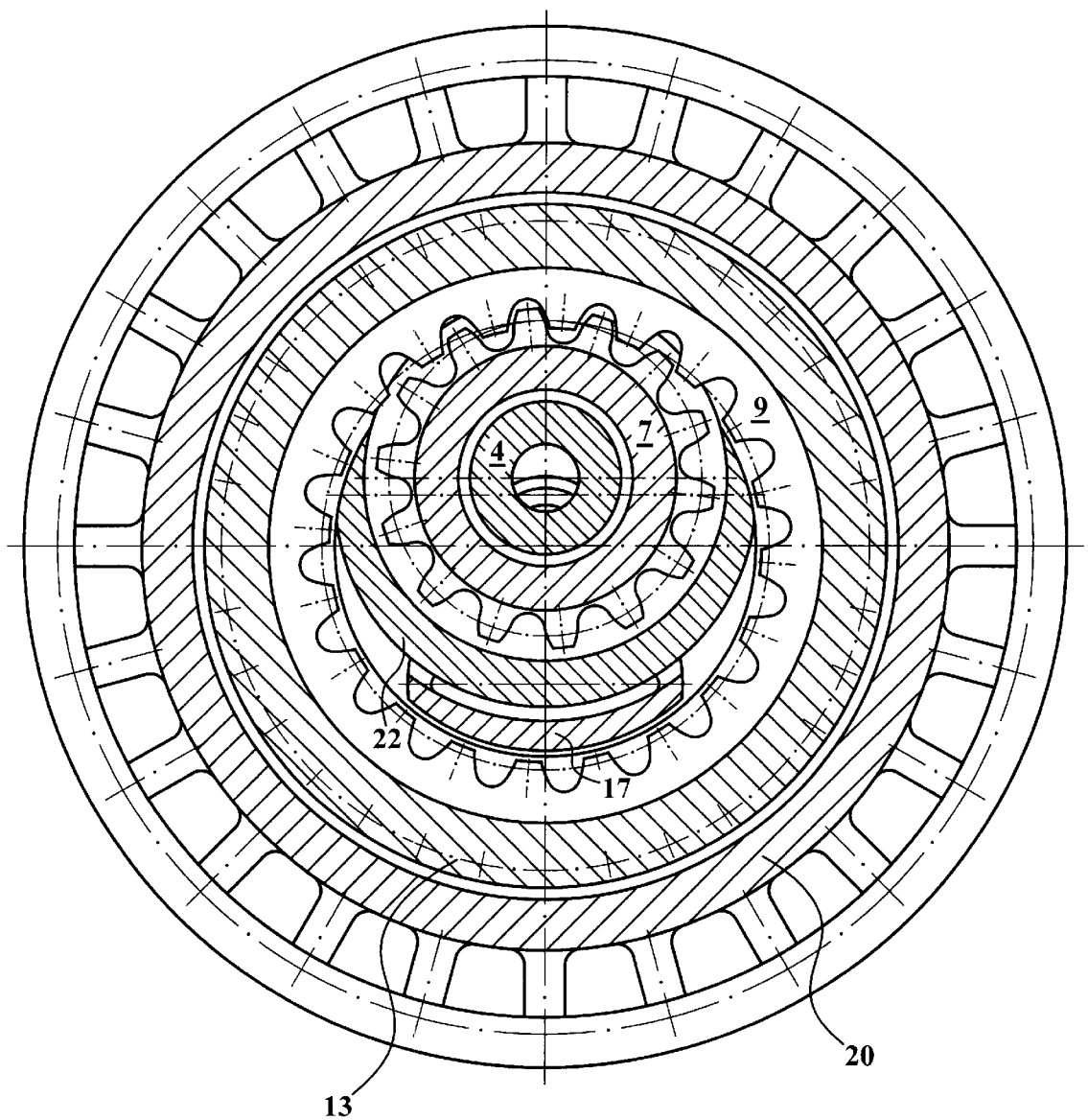

The high-speed shaft 1 of the two-stage gear transmission is connected through the gear-type coupling 2 with the rotatable externally toothed sun gear 3. The externally toothed planetary gears 23, 25 and 26 are rotatably mounted on the planet carrier 22 and each of them is in meshing engagement both with the rotatable externally toothed sun gear 3 and with the fixed internally toothed gear 5 which is secured to the housing 20 by means not shown. Each of the internally toothed gears 8 and 9 is in meshing engagement with a respective gear ring of the double-ring externally toothed planetary gear 7, which is rotatably mounted on the planet carrier 22 through the axle 4 and the bearings 6 and 10. The internally toothed gear 8 is secured to the housing 20 by means not shown. The internally toothed gear 9 and the cup-shaped slow-speed shaft 13 are joined through releasable connection and constitute a rigid member, which is rotatably mounted in the housing 20 through the bearings 19 and 14. One of the side supports of the planet carrier 22 is rotatably mounted through the bearing 24 in the hosing 20, and the other of said side supports is rotatably mounted through the bearing 12 and the cantilever support 16 in the cup-shaped slow-speed shaft 13. The cantilever support 16 is secured to the cup-shaped slow-speed shaft 13 through a taper joint and the corresponding axial compression, necessary for this purpose, is provided through the bolted-on connection 15. The counterweight 21 is secured to the planet carrier 22 by means not shown. The counterweight 17 is secured to the planet carrier 22 through the bolted-on connection 18. The cylinder sleeve 11 is secured to the planet carrier 22 and to the counterweight 17 by means not shown. As illustrated in FIG. 4, the externally toothed planetary gears 23, 25 and 26 are displaced relative to each other by equal angles about the central axis of the transmission. The externally toothed planetary gears 25 and 26 are of the same mass, which is less than the mass of the externally toothed planetary gear 23. The transmission is statically and dynamically balanced.

Figure 7:
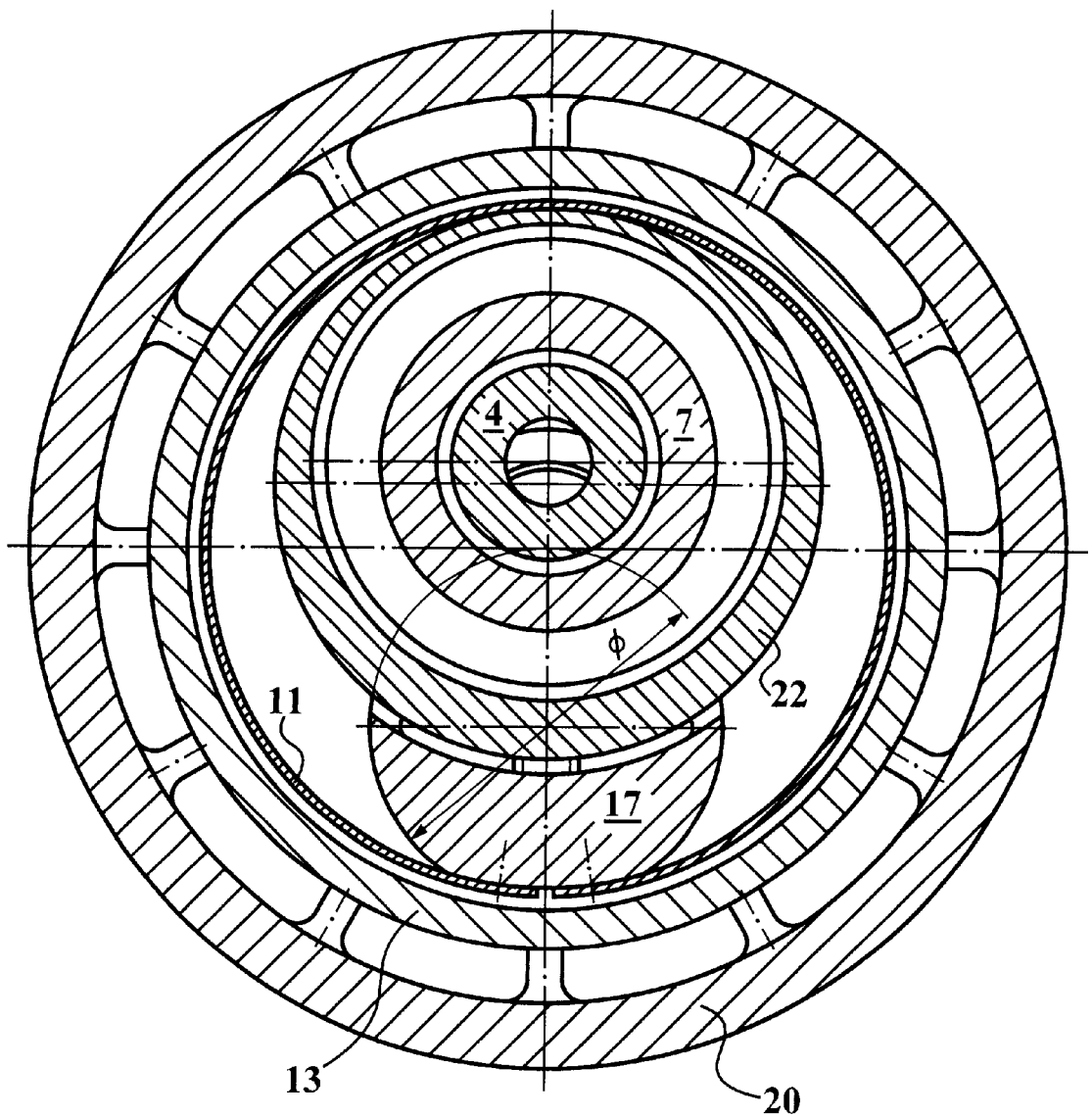
Figure 8:
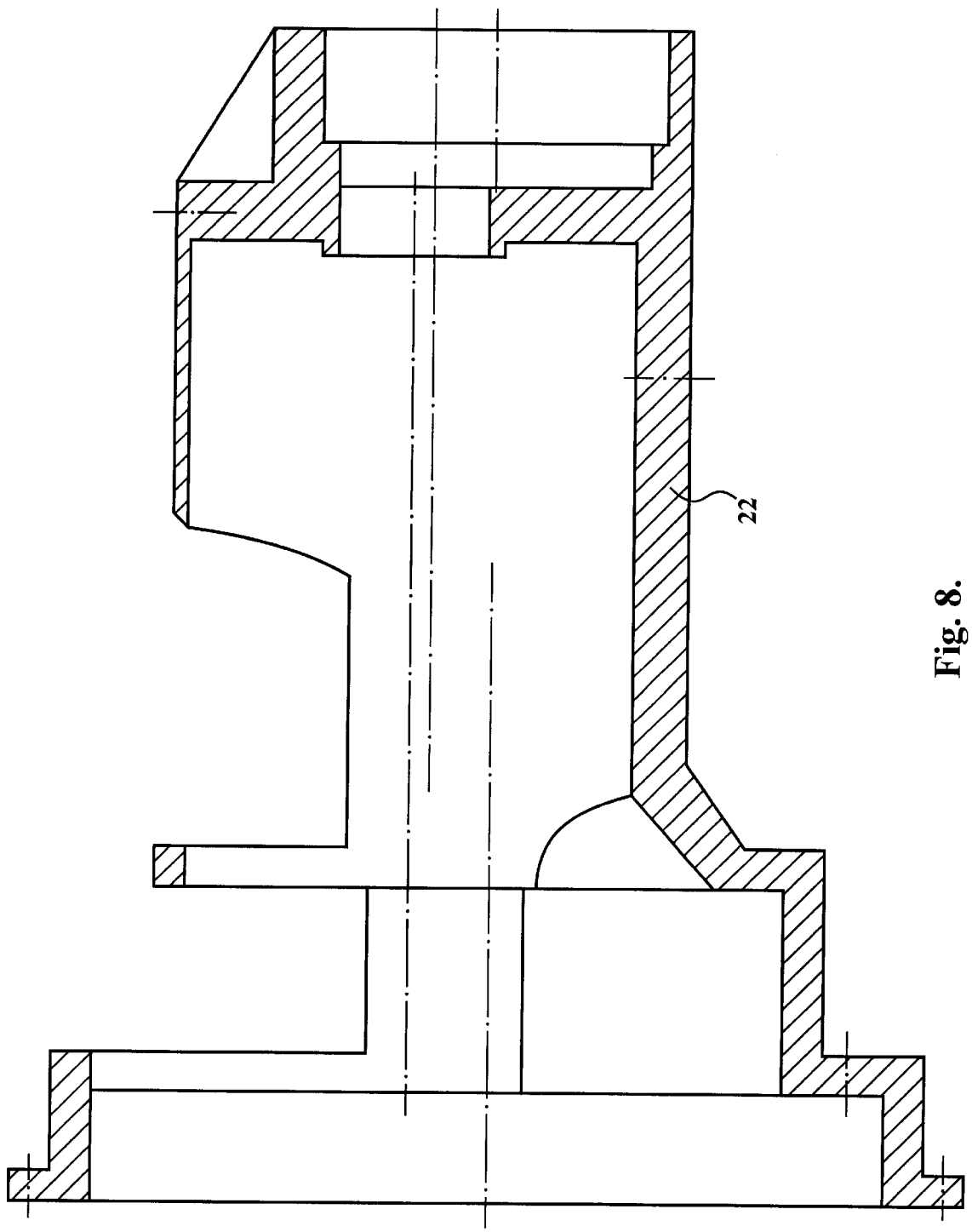
FIG. 8 and FIG. 9 are a two-dimensional sectional view and a perspective sectional view respectively of a part of the planet carrier of the transmission.
Figure 9:
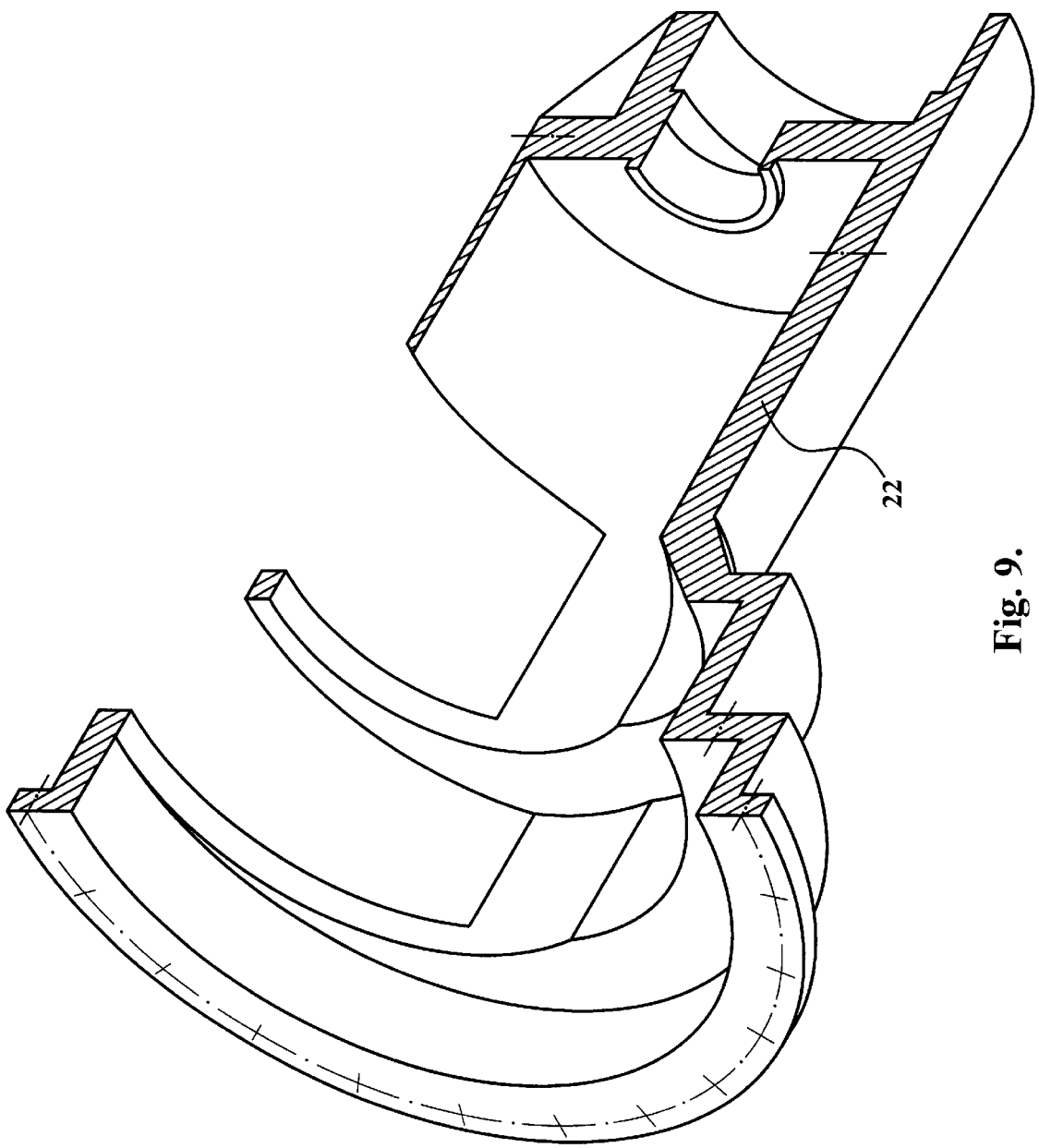

The tooth profile of all gears is of involute type. The rotatable internally toothed gear 9 and the respective gear ring of the double-ring externally toothed planetary gear 7 constitute an internal gearset allowing radial assembly and disassembly. As illustrated in FIG. 7, those of the surfaces of the counterweight 17 which are free of design limitations describe segments of a cylinder whose axis is parallel to and offset from the central axis of the transmission, the respective eccentricity being equal to the radius of said cylinder and, accordingly, the central axis of the transmission being a generating line of said cylinder. It can be proved that the above-described shape and disposition of the counterweight 17 are the optimal ones from the standpoint of minimizing the mass inertia of the transmission. The cylinder sleeve 11 serves as a hydrodynamic shield for reducing the frictional losses caused by the hydraulic resistance of the lubricating liquid. The number of teeth of the fixed internally toothed gear 8 is $N_F=18$. The number of teeth of the rotatable internally toothed gear 9 is $N_C=20$. The gear rings of the double-ring externally toothed planetary gear 7 are of different diameters but they have an equal number of teeth $N_A=N_B=14$, this equality being just a particular case, not a general rule. The gear ratio of the slow-speed stage of the transmission is $R_{eccentr.}=10.00$. The total gear ratio of the transmission is $R_{total}=100$.

The above-described two-stage gear transmission is just a particular embodiment of the invention and it should be pointed out that in the majority of cases it can be much more advisable to construct the transmission with all planetary gears of the high-speed stage being of an identical design and of equal mass instead of different.

While a particular embodiment of the invention has been described, the invention is capable of various changes in the form, construction and arrangements of the parts as will be apparent to those skilled in the art, and this application is intended to cover any of such changes that come within the scope of the invention.

What is claimed is:

1. An eccentric planetary gearing comprising two internally toothed gears, a double-ring externally toothed planetary gear and a planet carrier;

said double-ring externally toothed planetary gear having the design of a cluster gear comprising two externally toothed gear rings of different diameters coaxially aligned and consecutively disposed relative to one another;

said internally toothed gears being coaxially aligned and consecutively disposed relative to one another and their common axis being central axis of the gearing;

one of said internally toothed gears being mounted for rotation and the other being held in a fixed position;

said planet carrier being mounted for rotation about the central axis of the gearing;

said double-ring externally toothed planetary gear being rotatably mounted on said planet carrier;

the axis of said double-ring externally toothed planetary gear being parallel to and offset from the central axis of the gearing, the respective eccentricity being less than the outside radius of said double-ring externally toothed planetary gear, the central axis of the gearing lying, accordingly, inside the periphery of said double-ring externally toothed planetary gear;

each of said internally toothed gears being in meshing engagement with a respective gear ring of said double-ring externally toothed planetary gear;

said planet carrier comprising support means for providing the rotatable mounting of said planet carrier itself and the rotatable mounting of said double-ring externally toothed planetary gear, said support means being integrated into a rigid member through two interjacent crescent-shaped sections consecutively disposed relative to one another;

each of said interjacent crescent-shaped sections being disposed within the space between the respective gear ring of said double-ring externally toothed planetary gear and the respective internally toothed gear;

orthogonal projections of said interjacent crescent-shaped sections on a plane perpendicular to the central axis of the gearing being of different disposition relative to one another and, accordingly, at least one of the outer and the inner surfaces of said planet carrier being step-shaped along the junction of said interjacent crescent-shaped sections.

2. A two-stage gear transmission;

the slow-speed stage of the transmission having the design of an eccentric planetary gearing in accordance with claim 1;

the high-speed stage of the transmission having a design of a planetary gearing;

said slow-speed and said high-speed stages being coaxially aligned and their common central axis being central axis of the transmission too;

said slow-speed and said high-speed stages having a common planet carrier;

said high-speed stage comprising an externally toothed sun gear mounted for rotation about the central axis of the transmission, an internally toothed gear mounted in concentric relation with said rotatable externally toothed sun gear and held in a fixed position, and at least two externally toothed planetary gears equidistantly spaced from the central axis of the transmission and rotatably mounted on said common planet carrier;

each of said externally toothed planetary gears of said high-speed stage being in meshing engagement both with the respective rotatable externally toothed sun gear and with the respective fixed internally toothed gear;

said externally toothed planetary gears of said high-speed stage being displaced relative to each contiguous one by equal angles about the central axis of the transmission;

not all of said externally toothed planetary gears of said high-speed stage being of equal mass;

the mass center of the set of externally toothed planetary gears of said high-speed stage being offset from the central axis of the transmission, the respective eccentricity being opposite in direction in comparison with the eccentricity of the axis of the double-ring externally toothed planetary gear of said slow-speed stage with respect to the central axis of the transmission.

* * * * *